INVENTORS
HERBERT A. SAUVÉ
DAVID C. O. SLOAN

BY John F. Lawler
ATTORNEY

Nov. 16, 1971 H. A. SAUVÉ ET AL 3,619,886
OPTICAL ASSEMBLY SYSTEM
Filed Feb. 2, 1970 3 Sheets-Sheet 3

INVENTORS
HERBERT A. SAUVÉ
DAVID C. O. SLOAN
BY John F. Lawler
ATTORNEY

United States Patent Office 3,619,886
Patented Nov. 16, 1971

3,619,886
OPTICAL ASSEMBLY SYSTEM
Herbert A. Sauvé, Santa Cruz, and David C. O. Sloan, Boulder Creek, Calif., assignors to Sylvania Electric Products Inc.
Filed Feb. 2, 1970, Ser. No. 7,742
Int. Cl. H05k 13/04; B23g 17/00
U.S. Cl. 29—203 B
11 Claims

ABSTRACT OF THE DISCLOSURE

The system comprises a standard slide projector arranged to project images of components from transparent slides to a workpiece, such as a printed circuit board, on a worktable. A plurality of storage bins containing different components and located close to the work area have indicator lights under the bins, respectively, and are connected to a power source through a multi-contact switch plate mounted adjacent to the rotatable slide holder of the projector. Movable contacts on a slide in the holder successively close switches to lamps adjacent to respective bins containing components corresponding to component images on the slides in the order in which those images are projected to the workpiece. Component location on the workpiece, the shape of the component and identification of the storage bin which contains it are communicated simultaneously to the assembler.

BACKGROUND OF THE INVENTION

This invention relates to manual assembly apparatus, and more particularly to an optical system for assisting manual assembly of a plurality of components on a workpiece.

With increasing labor rates and the scarcity of skilled labor, however, it is essential for the efficient manufacturer to insure that the manual assembler perform his work quickly and accurately. This is especially true with the assembly of many small components at a variety of locations on a workpiece such as inserting electrical components in printed circuit boards. Such components consist of resistors, condensers, diodes, inductors and the like which, because of their sizes and numbers often required on each board, are easily incorrectly located or even interchanged with incorrect components. In order to relieve the assembler of some of the burden of translating assembly information from circuit diagrams and thereby increase his speed and reduce mistakes, semi-automatic assembly stations have been developed.

Prior art apparatus and techniques for assisting in the assembly of printed circuit boards includes a machine which optically projects an arrow or similar marker on the circuit board blank as a means of indicating the proper location of the component to be mounted. This apparatus includes tape controlled elevators or transports for trays of components from storage positions to an operation position accessible to assembler as a means of insuring proper component selection. While such apparatus tends to increase the efficiency of the printed circuit board assembler, it is very complex and quite costly so that its application is limited to high production runs that can justify the investment. In addition, this apparatus is expensive to maintain which subtracts from the overall cost reduction objective. Finally, reprograming the apparatus for a different assembly operation not only requires the services of a skilled technician but also involves considerable down time.

An object of this invention is the provision of an optical assembly system for printed circuit boards and the like which provides the assembler with more information needed to assemble a circuit board than has been available heretofore.

Another object of this invention is the provision of an optical assembly system having standard low-cost optical projection equipment which results in substantial reduction in the cost of the system.

A further object is the provision of such a system which is readily and quickly convertible to different assembly operations.

SUMMARY OF THE INVENTION

A conventional slide projector as a component image projector is adapted to further control indicator lamps on component bins by the addition of a multi-element switch plate adjacent to the projector mechanism. The image of each component giving its size and relative position is projected to the workpiece to precisely indicate where the component is to be inserted and at the same time an indicator lamp on one of many bins containing the proper component to be assembled is lit. Closing of each switch by moving contacts on the projector slide holder insures proper synchronization of slide projection and indicator light energization.

DESCRIPTION OF A PREFERRED EMBODIMENT

Figure 1:
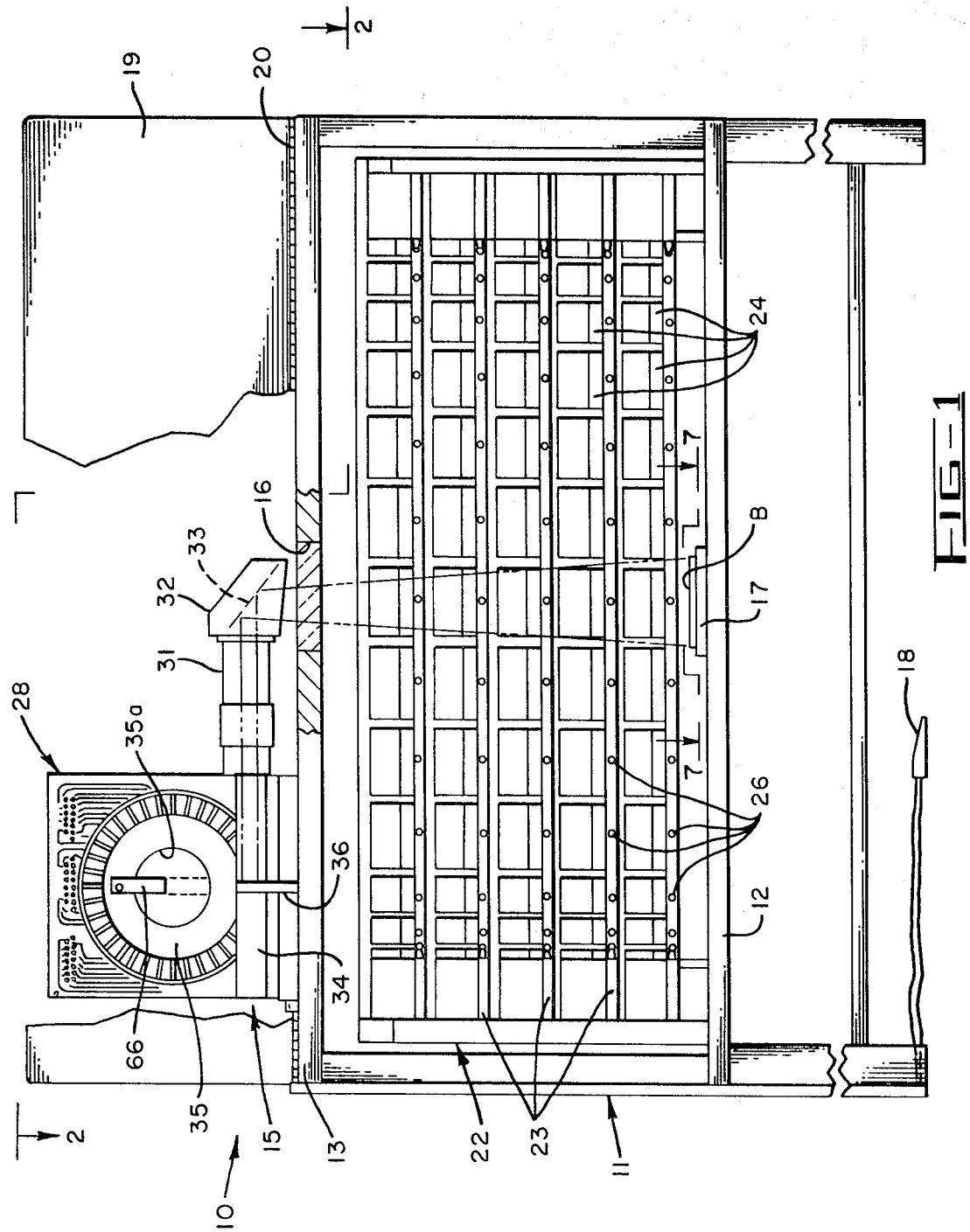
FIG. 1 is a front elevation of a circuit board assembly bench showing the location of the bins and projector apparatus.
Figure 2:
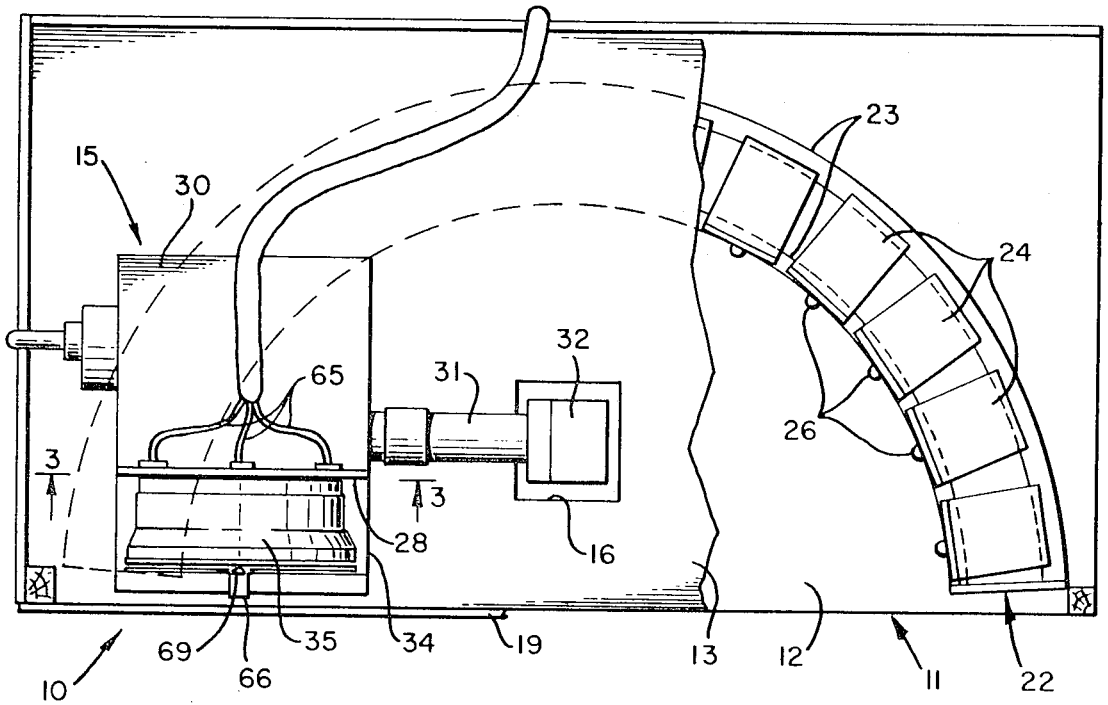
FIG. 2 is a horizontal section taken on line 2—2 of FIG. 1.

Referring now to the drawings, FIGS. 1 and 2 show a circuit board assembly system 10 comprising a workbench 11 having a table 12 on which assembly work is performed, a top shelf 13, and a projector 15 mounted on the shelf. An aperture or window 16 in shelf 13 transmits images from the projector 15 to an assembly block 17 on table 12 below. Projector 15 is connectable to a source of electric power not shown and is controlled by a remote switch, such as foot switch 18, accessible to the operator or assembler while seated at the table. A screen 19 projecting upwardly from the front of shelf 13 protects the projector from tampering and may be secured by hinge 20 to the shelf to provide ready accessibility to the projector when required.

Mounted in a semi-circular pattern on table 12 about assembly block 17 is a multi-tiered rack 22 having vertically spaced horizontally extending frames 23 on which a plurality of removable component bins 24 are supported.

These bins preferably are open-top containers designed for ready accessibility to the hand of the assembler seated in front of the workbench table and also readily removable from the rack for replenishing the components contained in them. Each of the plates 23 is provided with a plurality of horizontally spaced lamps 26, the spacing between lamps corresponding to the width of each bin so that each lamp underlies the middle of a bin supported directly above it. These lamps when lit serve to identify for the assembler the bin which contains components of the type needed for the particular step in the assembly operation. Each of the lamps 26 on rack 22 is connected to a power source through a contact on a multi-contact switch on an adapter unit 28, see FIG. 3, mounted on the body of projector 15 and described in detail below.

Projector 15 comprises a lamp housing 30, a lens extension arm 31 connected to housing 30 and having at its outer end a reflector unit 32 containing an angularly disposed downwardly facing mirror 33, and a base 34 adjacent to the lower side of housing 30 and shaped to receive a cylindrical slide holder 35. Slides are adapted to be mounted in radial slots near the periphery of holder 35 so as to be movable into and out of the lamp housing by a reciprocable solenoid-actuated arm 36 on base 34.

The projector and reflector unit described above are standard commercially available products and do not per se constitute part of this invention. In accordance with this invention, however, the projector is uniquely adapted to selectively operate bin indicator lamps 26 to correspond with the angular displacement of slide holder 35 and thus a predetermined slide in the holder. Such adaptation of the projector is accomplished with an adapter unit 28. This unit comprises a stationary multi-contact plane switch plate 38 secured by screws 39 to the body of lamp housing 30 and extending vertically between the latter and slide holder 35.

Figure 3:
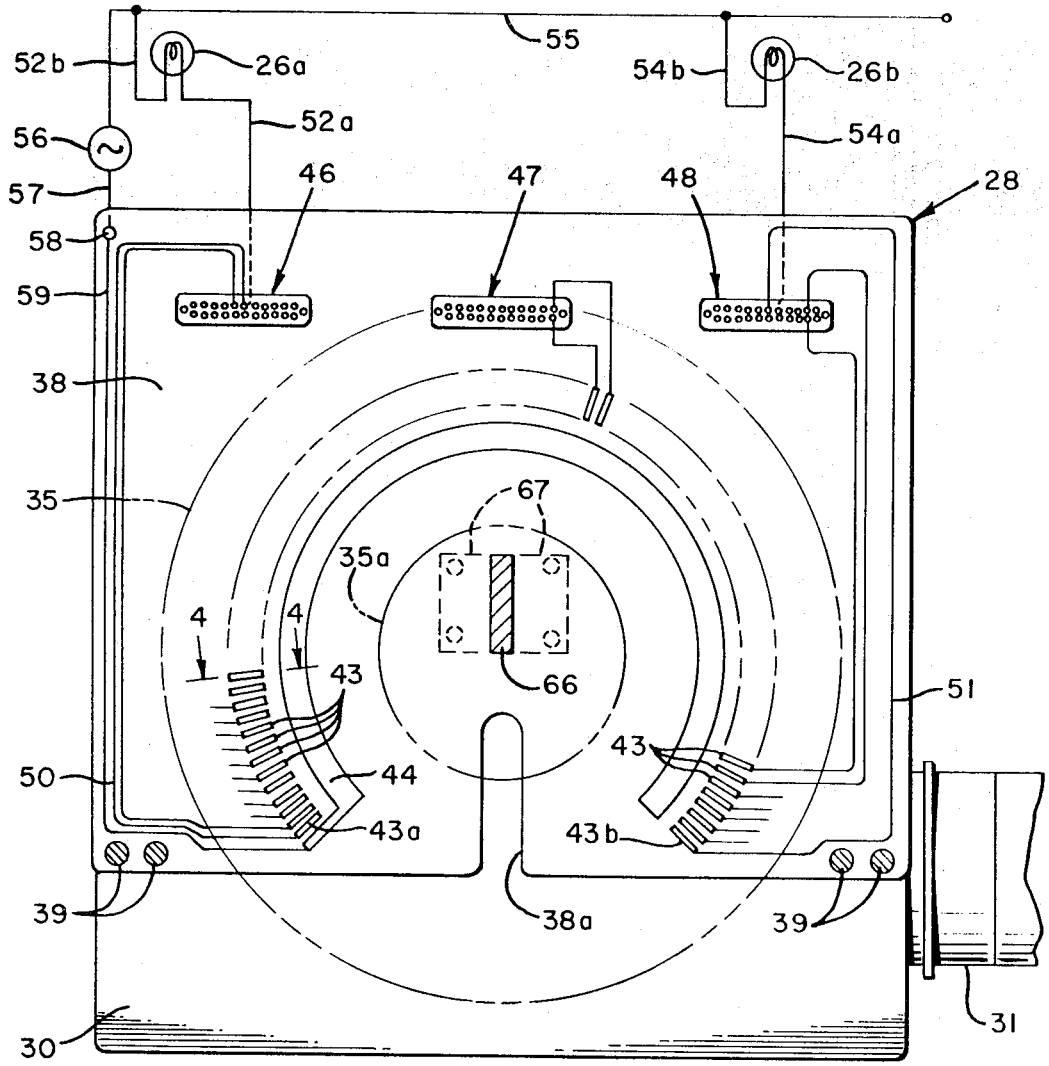
FIG. 3 is a partially schematic enlarged view of the switch plate adapter for the projector as viewed on line 3—3 of FIG. 2.

Plate 38 preferably is a dielectric board on which is formed by printed circuit deposition techniques or the like a plurality of closely spaced conductive segments 43 arranged in an arcuate row for approximately 270 degrees. A single continuous arcuate conductive strip 44 spaced radially inwardly from segments 43 is formed on the board opposite the segments over the same arcuate length. Each segment 43 is connected by a separate line to one of several terminals on terminal blocks 46, 47 and 48 spaced across the upper portion of plate 38. For example, the first segment 43a of the group in the lower left corner as viewed in FIG. 3, is connected by a line 50 to one of the terminals of terminal block 46 and the last segment 43b is connected by line 51 to one of the terminals of terminal block 48. Lead 52a of one of the bin lamps 26a is connected to line 50 through a common terminal on block 46, preferably on the opposite or back side of plate 38 as shown. Similarly, lamp 26b is connected on one side by lead 54a to line 51 through a common terminal on block 48. The other side leads 52b and 54b of lamps 26a and 26b, respectively, are connected to a common bus 55 which is connected to one terminal of a power source 56. The other terminal of power source 56 is connected by line 57 to a post 58 which is electrically connected by line 59 to strip 44. While the connection of only two of the bin lamps is illustrated and described herein for the sake of clarity, it will be understood that all of the bin lamps 26 are so connected in parallel with power source 56 and across segments 43, respectively, and the conductive strip 44.

The angular spacing of adjacent segments 43 is equal to the angular displacement of slide holder 35 when advancing from the projection position of one slide to that of the slide in the immediately adjacent slide slot. Recess 38a in the lower part of plate 38 provides an opening through which slide moving arm 36 may reciprocate.

Figures 4, 5:
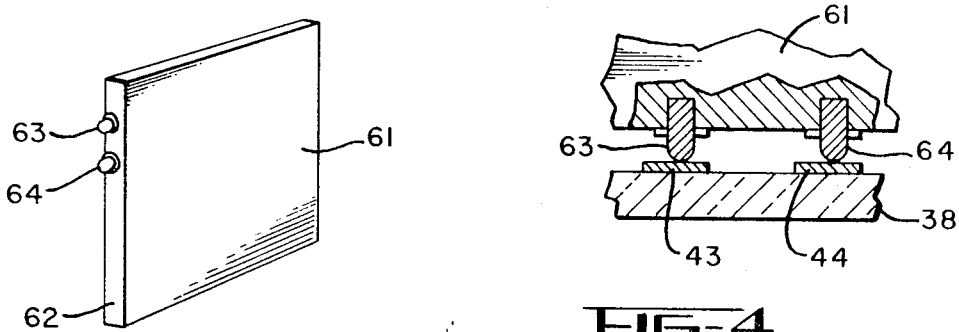
FIG. 4 is a greatly enlarged section taken on line 4—4 of FIG. 3 showing one set of stationary contacts closed by the movable contacts.
FIG. 5 is a perspective view of a slide plate which constitutes the moving contact member.

In order to close the circuit to the respective bin lamps as slide holder 35 rotates in steps about its axis, a conductive generally rectangular contact plate 61 with outside dimensions corresponding to those of each of the slides is inserted into a predetermined slide slot in the holder. Plate 61 has a side edge 62 and a pair of contact pins 63 and 64 press fitted into and extending outwardly from edge 62 by distance to permit engagement with plate 38 when the holder is in the operating position. Pins 63 and 64 are so spaced relative to each other and along edge 62 as to be aligned and engageable with segments 43 and strips 44, respectively, as shown in FIG. 4, when plate 61 is disposed in one of the slots of holder 35. Thus, sequential switching of bin lamps 26 is accomplished with standard slide projection apparatus with no modification required. Plate 61 may be made of electrically conductive material such as brass, or may be made of plastic or similar material with a jumper between pins 63 and 64.

The conductors on adapter 28 including segments 43, strip 44 and associated lines preferably are made in accordance with well known printed circuit techniques. The terminals on blocks 46, 47 and 48 connect on the back side of the board to lines 65 which ultimately connect to bin lamps 26.

In order to insure positive contact between the moving and stationary contacts of the switch assembly, a pressure arm 66 is mounted on plate 38 so as to extend through a central opening 35a in slide holder 35 and make anti-friction engagement with the outer surface of the holder. Arm 66 is secured by flanges 67 to the back side of plate 38 and effects anti-friction engagement with the holder by means of inwardly extending spring loaded ball 69 on the outer upper end of arm 66.

Figure 6:
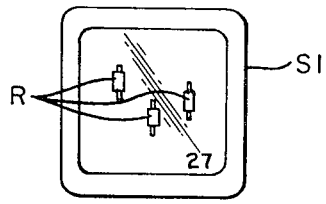
FIG. 6 is a plan view of a transparent slide on which images of circuit board components have been formed photographically.
Figure 8:
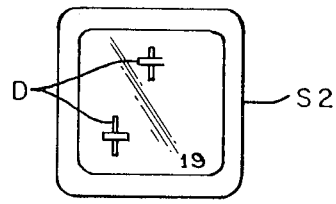
FIG. 8 is a view of a slide similar to that of FIG. 6 showing a differently shaped component at different locations.
Figure 7:
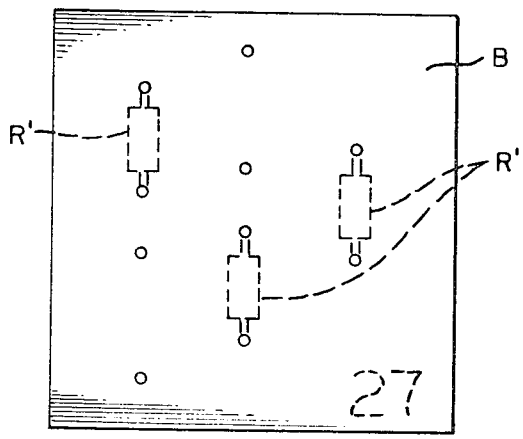
FIG. 7 is an enlarged view taken on line 7—7 of FIG. 1 showing a simplified circuit board having the component image and identification number projected thereon from the slide FIG. 6 and indicated in broken lines.
Figure 9:
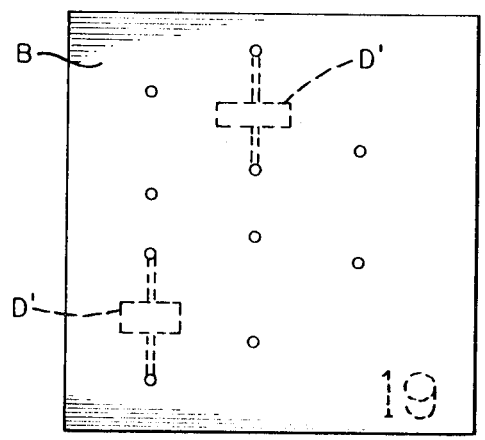
FIG. 9 is a view similar to FIG. 7 showing the location and shape of the images of FIG. 8 projected on a circuit board.

Photographic transparencies in the form of slides are prepared for use in the projector in accordance with this invention from photographs of the layouts of identical components which comprise the assembled printed circuit board. For example, one slide has images of all of the identical resistors to be mounted on the board and shows an outline of the shape of each of these resistors as well as its position relative to the other resistors on the board. Such slides S1 and S2 are shown in FIGS. 6 and 8, respectively, with the images of resistors R and diodes D. The slides may also show an identification number of the component as indicated. The images of resistors R on slide S1 are projected by the projector through shelf aperture 16, see FIG. 1, to board B on assembly block 17 on the table below so that these images precisely overlay the positions of the actual components when assembled on the board. The images R' of the resistors are shown in broken lines in FIG. 7 and illustrate the appearance of the drilled board B prior to the manual assembling of the actual resistors on the board. In like manner, when slide S2 is moved into the projector, the projected images D' of photographic images D appear on the board as indicated in broken lines in FIG. 9.

In preparing the optical assembly system for operation in accordance with the invention, slides of the respective components are serially arranged in holder 35 in the desired order of assembly of those components on the board. Bins containing the actual components to be assembled are then placed in rack 22 in a predetermined order, preferably in side by side succession on the same horizontal row, so that the lamp 26 under the bin containing the first components to be assembled is energized when the slide bearing the image of that component is in the operative position for projection within projector 15. Similarly, the second slide in the holder is for the second component to be mounted on the board and the remainder of the slides are arranged in this order. Moving contact plate 61 is positioned in the slot in slide holder 35 so as to close the contacts on stationary plate 38 for energization of the lamp under the bin containing the first component to be assembled, the image of which component is then being projected on board B. After all of the first components are properly mounted on or inserted in board B, the assembler actuates remote control switch 18 to cause the projector to advance the second slide into the operating position, simultaneously energizing the lamp below the bin containing the supply of the second components to be assembled. This procedure is followed until assembly of all the components on the circuit board is complete, and the cycle is repeated for the next circuit board to be assembled.

We claim:
1. A system for assisting the manual assembly of a plurality of different components on a workpiece comprising
   a plurality of bins supported adjacent to the location of the workpiece, each of said bins being adapted to contain a different one of said components,
   a plurality of electrically controllable indicators supported adjacent to said bins, respectively, whereby each indicator has visual correspondence with one only of said bins,
   a slide projector having a rotatable slide holder with a plurality of slots for receiving slides to be projected, said projector being positioned to project slide images onto said workpiece,
   an adapter unit mounted on said projector adjacent to said holder comprising a plurality of stationary switch contacts and means for electrically connecting different pairs of said contacts to said indicators, respectively, whereby each pair of contacts controls operation of one only of said indicators,
   a movable contact mounted on said slide holder and engageable with each of said pair of stationary contacts in succession as said holder rotates,
   a source of power, and
   means for operatively connecting said source to said stationary contacts and to said indicators.

2. The system according to claim 1 in which said movable contact comprises a plate removably disposed in one of said slots in the holder.

3. The system according to claim 1 in which said adapter unit comprises a non-conductive sheet and said stationary contacts are strip conductors on said sheet.

4. The system according to claim 3 with a pressure arm secured to and projecting from said sheet and yieldably engaging the side of said holder remote from said stationary contacts whereby positively to press said movable contact against the stationary contacts.

5. The system according to claim 4 with a remote control switch operatively connected to said projector and positioned proximate to the workpiece for actuation by an operator at the completion of each assembly cycle.

6. A system for assisting manual assembly of components on a workpiece at an assembly location comprising
   a slide projector supported within projecting distance from said workpiece and having a holder adapted to hold a plurality of photographic transparent slides, said slides having images of different components, respectively, formed thereon in relative positions corresponding to the final positions of said components on the workpiece, said holder being arranged to move in steps relative to the projector body to advance said slides successively into operative positions for projecting the images of successive slides on said workpiece,
   a plurality of bins at said assembly location spaced less than an armlength from said workpiece, said bins containing different components, respectively, to be assembled on said workpiece,
   a plurality of lamps mounted adjacent to said bins, respectively,
   means for energizing said lamps, and
   switch means electrically connected between each of said lamps and said energizing means and actuatable by said slide holder whereby visual correspondence is established between the projected image of a component and the bin containing the same component.

7. A system for assisting an operator in the manual assembly of a plurality of different components on a workpiece comprising
   a plurality of bins supported adjacent to the location of the workpiece, each of said bins being adapted to contain a different one of said components,
   a plurality of electrically controllable indicators supported adjacent to said bins, respectively, whereby each indicator has visual correspondence with one only of said bins,
   a projector and film means supported adjacent thereto, said film means comprising a plurality of image-bearing transparencies arranged in a predetermined series for projection in sequence by said projector onto said workpiece,
   means for successively advancing said transparencies into image-projectnig position within said projector,
   a source of power for energizing said indicators, and
   switch means connected between said power source and said indicators and responsive to the positioning of each transparency in said image-projecting position for energizing the corresponding bin indicator.

8. The assembly system according to claim 7 in which said advancing means comprises a manual switch proximate to the operator.

9. The assembly system according to claim 7 in which said switch means comprises an array of switches electrically connected between said source and said indicators and operable in a sequence identical to said transparency projection sequence for correspondingly energizing said indicators.

10. A system for assisting manual assembly of components on a workpiece at an assembly location comprising
    a projector supported within projecting distance from said workpiece and having film means containing a plurality of photographic transparencies, said transparencies having images of different components, respectively, formed thereon in relative positions corresponding to the final positions of said components on the workpiece, said film means being arranged to move in steps relative to the projector to advance said transparencies successively into operative positions for projecting the images of successive transparencies on said workpiece,
    a plurality of bins at said assembly location spaced less than an armlength from said workpiece, said bins containing different components, respectively, to be assembled on said workpiece,
    a plurality of lamps mounted adjacent to said bins, respectively,
    means for energizing said lamps, and
    switch means electrically connected between each of said lamps and said energizing means and actuatable by said film means whereby visual correspondence is established between the projected image of a component and the bin containing the same component.

11. The assembly system according to claim 10 in which said film means comprises
    a slide holder having a plurality of slots
    slide transparencies in certain of certain said slots, respectively,
    said switch means comprising a switch plate in another of said slots.

References Cited

UNITED STATES PATENTS

| | | | |
|---|---|---|---|
| 3,372,455 | 3/1968 | Howie | 29—407 |
| 3,548,493 | 12/1970 | Hubbard | 29—626 |

THOMAS H. EAGER, Primary Examiner

U.S. Cl. X.R.

29—407